United States Patent
Westerfeld et al.

(10) Patent No.: US 6,614,634 B1
(45) Date of Patent: Sep. 2, 2003

(54) FIELD BUS ARRANGEMENT WITH A FIELD BUS DISTRIBUTOR

(75) Inventors: Peter Westerfeld, Friedberg (DE); Gunter Von Zur Gathen, Mettman (DE)

(73) Assignee: ABB Patent GmbH, Manheim (DE)

( * ) Notice: Subject to any disclaimer, the term of this patent is extended or adjusted under 35 U.S.C. 154(b) by 0 days.

(21) Appl. No.: 09/623,536

(22) PCT Filed: Mar. 3, 1999

(86) PCT No.: PCT/DE99/00630

§ 371 (c)(1),
(2), (4) Date: Nov. 16, 2000

(87) PCT Pub. No.: WO99/45621

PCT Pub. Date: Sep. 10, 1999

(30) Foreign Application Priority Data

Mar. 6, 1998 (DE) .......................................... 198 10 778
Mar. 2, 1999 (DE) .......................................... 199 10 409

(51) Int. Cl.$^7$ ................................................. H02H 3/00
(52) U.S. Cl. ............................ 361/62; 361/64; 361/58; 361/115

(58) Field of Search ............................ 361/62, 64, 66, 361/90, 115, 78, 93.1, 42, 118, 58

(56) References Cited

U.S. PATENT DOCUMENTS

| | | | | |
|---|---|---|---|---|
| 3,845,356 A | * | 10/1974 | Bullard et al. ................. | 361/52 |
| 5,682,476 A | * | 10/1997 | Tapperson et al. .......... | 370/225 |
| 5,835,534 A | * | 11/1998 | Kogure ........................ | 375/257 |
| 6,032,203 A | * | 2/2000 | Heidhues ..................... | 710/11 |

* cited by examiner

Primary Examiner—Stephen W. Jackson
(74) Attorney, Agent, or Firm—Michael M. Rickin, Esq.

(57) ABSTRACT

The invention relates to a field bus arrangement with a field bus distributor (11) for mounting in the area (1) at risk of explosion, for feeding a plurality of field devices (121 to 12n), arranged in the area (1) at risk of explosion, via intrinsically safe electric circuits (13) from at least one high-energy voltage source (21) arranged in the area (2) not at risk of explosion. For this purpose, in the area (2) not at risk of explosion, a field bus coupler (22) arranged in the area (2) not at risk of an explosion and having three electric circuits which are DC-isolated from one another is provided.

18 Claims, 3 Drawing Sheets

FIELD BUS ARRANGEMENT WITH A FIELD BUS DISTRIBUTOR

DESCRIPTION

The invention relates to a field bus arrangement with a distributor for field bus systems, which distributor can preferably be mounted in the area of a process engineering installation that is at risk of explosion.

Field buses are electrical apparatuses for communication between, on the one hand, field devices arranged in the area at risk of explosion, the so-called field area, examples of said field devices being sensors, actuators and measurement transducers, and, on the other hand, open-loop and closed-loop control systems arranged in the area not at risk of explosion, the so-called control room area. A field bus is usually designed as a two-wire line which simultaneously serves for transmitting the supply power for the connected field devices. In this case, the communication is effected in an analog fashion via a 0/4 . . . 20 mA current loop or digitally, for example by means of FSK modulation, or by combined analog/digital signal transmission.

For use in areas that are at risk of explosion, particular requirements are made of electrical operating equipment in order to preclude a possible explosion accident. In the context of installing and commissioning electrotechnical apparatuses and equipment and in the course of maintenance work on electrotechnical apparatuses and equipment in process engineering installations which, because of their intended use, are located in an atmosphere at risk of explosion, the observance of relevant statutory provisions such as the "Regulation on electrical installations in areas at risk of explosion—ElexV", which is based on the European standards for explosion protection EN 50 014 ff., is binding.

On account of these statutory provisions, intrinsically safe electric circuits, exclusively, said circuits being subject to the rules of EN 50 020 as "intrinsic safety" type of protection, are allowed to unconditionally disconnect and connect electrical lines in the course of operation.

Intrinsically safe electric circuits are subject to power limitation, however, and are thus unsuitable for the connection of devices and apparatuses with a power demand which exceeds the predetermined limit value.

In the case of all other types of protection, prior to manipulation on electric circuits, the entire installation must be disconnected from the voltage supply to an extent such that metallic components of the relevant electric circuits are isolated from voltage. In this case, the progress of the process proceeding on the process engineering installation is interrupted for the period of time between disconnection from the voltage supply and restart. The process then has to be started up anew. Operators of such process engineering installations find these interruptions extremely disruptive.

Safety barriers of multichannel design are known, e.g. from MTL (4700 series), in which each measurement channel is equipped with separate current limiting and separate voltage limiting. Safety barriers are regularly arranged in the area not at risk of explosion.

Furthermore, the patent specification DE 44 03 961 C2 describes a supply system for an intrinsically safe field bus, in which the means for current and voltage limiting are arranged such that they are spatially separate. What is disadvantageous in this case is the certification in accordance with the applicable statutory provisions on account of the inclusion of a plurality of devices in the certificate of conformity for explosion protection.

The invention is based on the object, therefore, of specifying a field bus arrangement with a field bus distributor—which can be mounted in the area of a process engineering installation that is at risk of explosion—for providing a multiplicity of connecting terminals of intrinsically safe electric circuits for power supply and data transmission for field devices having a bus capability, in which case the field bus distributor can be expanded to form an operationally ungrounded safety barrier.

According to the invention, this object is achieved by the means of Patent Claim 1. Advantageous refinements of the invention are specified in the claims referring back thereto.

The basic concept of this invention is the conversion and distribution of a large electrical power for supplying energy to field devices and also the reduction and limiting thereof to currents and voltages which enables the connection of certified explosion-protected operating equipment.

To that end, a field bus distributor which realizes the reduction of current and voltage to intrinsically safe values is arranged in the area of a process engineering installation that is at risk of explosion, the number of field devices that can be connected being as high as possible.

In detail, a high-energy voltage source is arranged in the area not at risk of explosion, the output power of which voltage source can be dimensioned independently of limitations prescribed by types of protection in accordance with the number of field devices to be connected and the line requirement thereof.

Furthermore, the main field bus run carrying exclusively communication signals appertaining to the data transmission is laid in the area not at risk of explosion.

The main field bus run and the voltage source are connected to a field bus coupler, which is preferably arranged in the area not at risk of explosion. The field bus coupler has three electric, circuits which are DC-isolated from one another, of which a first electric circuit is connected to the main field bus run. The field bus coupler is connected to the voltage source via a second electric circuit. The third electric circuit is routed as a non-intrinsically safe electric circuit into the area at risk of explosion and the supply voltage of the voltage source and the communication signals appertaining to the data transmission are applied to said third electric circuit.

The conductors of the non-intrinsically safe electric circuit are connected to terminals of a protected connection for connection of a non-intrinsically safe electric circuit of a field bus distributor arranged in the area at risk of explosion. This field bus distributor is equipped with n connections for intrinsically safe electric circuits for connection of a plurality of field devices. Each of the n connections for intrinsically safe electric circuits is connected to a busbar arrangement via a current limiting means. The protected connections for connection of a non-intrinsically safe electric circuit are connected to the busbar arrangement via voltage limiting means.

The field bus distributor has a housing-like encapsulation enclosing all the live components as a whole.

Each intrinsically safe electric circuit proceeding from the field bus distributor carries a voltage- and current-intensity-limited supply power for the connected field devices and superposed communication signals appertaining to the data transmission.

It is advantageous that the outlay on cabling between apparatuses in the area not at risk of explosion and apparatuses in the area at risk of explosion is very low. In this case, the subject matter of the present invention avoids both the voltage limiting for each measurement channel in the case of multichannel safety barriers and the inclusion of a plurality of devices in a certificate of conformity, since, in the context of the field bus arrangement which is the subject matter of the invention, only the field bus distributor is inherently the subject of official certification. Consequently, the technical outlay for attaining the certification that is prescribed for the use of electrical operating equipment in the area at risk of explosion is limited to the minimum that is technically necessary.

The voltage limiting means are constructed from zener diodes which are redundantly reverse-connected in series and are connected in parallel with the non-intrinsically safe electric circuit and upstream of which at least one fuse is connected on the supply side. By virtue of the grounding of the node of the interconnection of zener diodes, the voltage limiting means can be expanded to form an operationally ungrounded safety barrier in a simple and advantageous manner and with additional components being dispensed with.

The invention is explained in more detail below using exemplary embodiments. In the drawings required for this:

Figure 1:
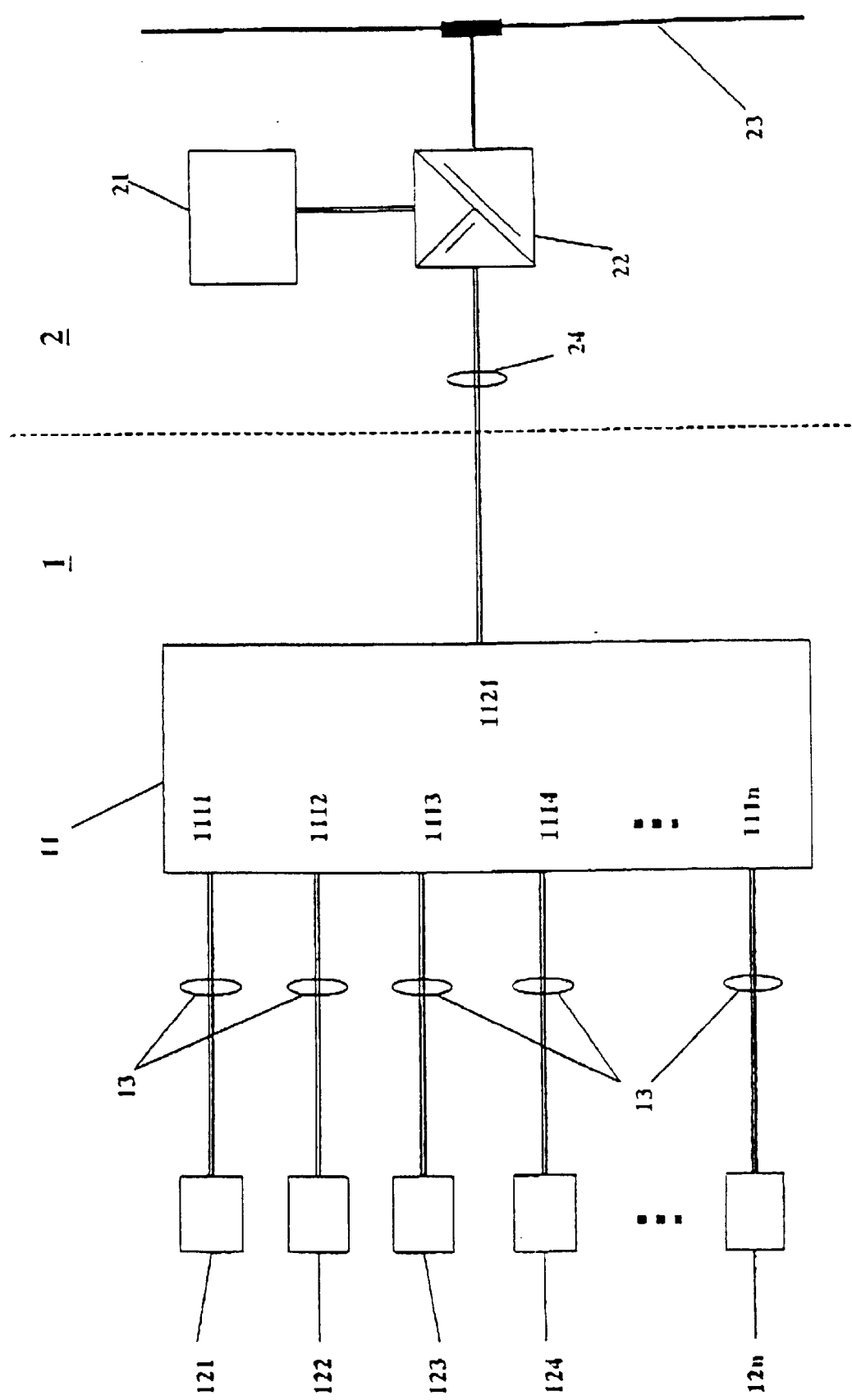
FIG. 1 shows a basic illustration of a field bus arrangement

The functional principle is evident from FIG. 1. The field bus is conveyed via a field bus coupler 22 proceeding from a main field bus run 23, which is routed in the area 2 not at risk of explosion, to the field bus distributor 11 in the area 1 at risk of explosion. In this case, the field bus coupler 22 is arranged in the area 2 not at risk of explosion and comprises a standardized physical interface for coupling the field bus which is routed into the area 1 at risk of explosion. The required power supply via the field bus is also provided via the field bus coupler 22.

The main field bus run 23 is connected to a process control system or a stored-program controller in which measurement data received via the field bus are evaluated and processed and proceeding from which manipulated variables and configuration settings can be sent via the field bus. The requisite transmission mechanism is defined in a wide variety of national and international standards. At present the widespread application of a physical transmission level for installations at risk of explosion is the interface according, to IEC 1158 Part 2, in which the data are transmitted by means of Manchester coding.

However, in principle the invention can be applied to all field bus systems which enable transmission via a core pair. This also includes the customary HART interface for analog measurement transducers in a multidrop circuit, the simultaneous transmission of the analog measured value being dispensed with in this case.

In detail, a high-energy voltage source 21 is arranged in the area 2 not at risk of explosion, the output power of which voltage source can be dimensioned independently of limitations prescribed by types of protection in accordance with the number of field devices 121 to 12n to be connected and the line requirement thereof.

Furthermore, the main field bus run 23 carrying exclusively communication signals appertaining to the data transmission is laid in the area 2 not at risk of explosion.

The main field bus run 23 and the voltage source 21 are connected to a field bus coupler 22, which is arranged in the area 2 not at risk of explosion. The field bus coupler 22 has three electric circuits which are DC-isolated from one another, of which a first electric circuit is connected to the main field bus run 23. The field bus coupler 22 is connected to the voltage source 21 via a second electric circuit. The third electric circuit is routed as a non-intrinsically safe electric circuit 24 into the area 1 at risk of explosion and the supply voltage of the voltage source 21 and the communication signals appertaining to the data transmission are applied to said third electric circuit.

Figure 2:
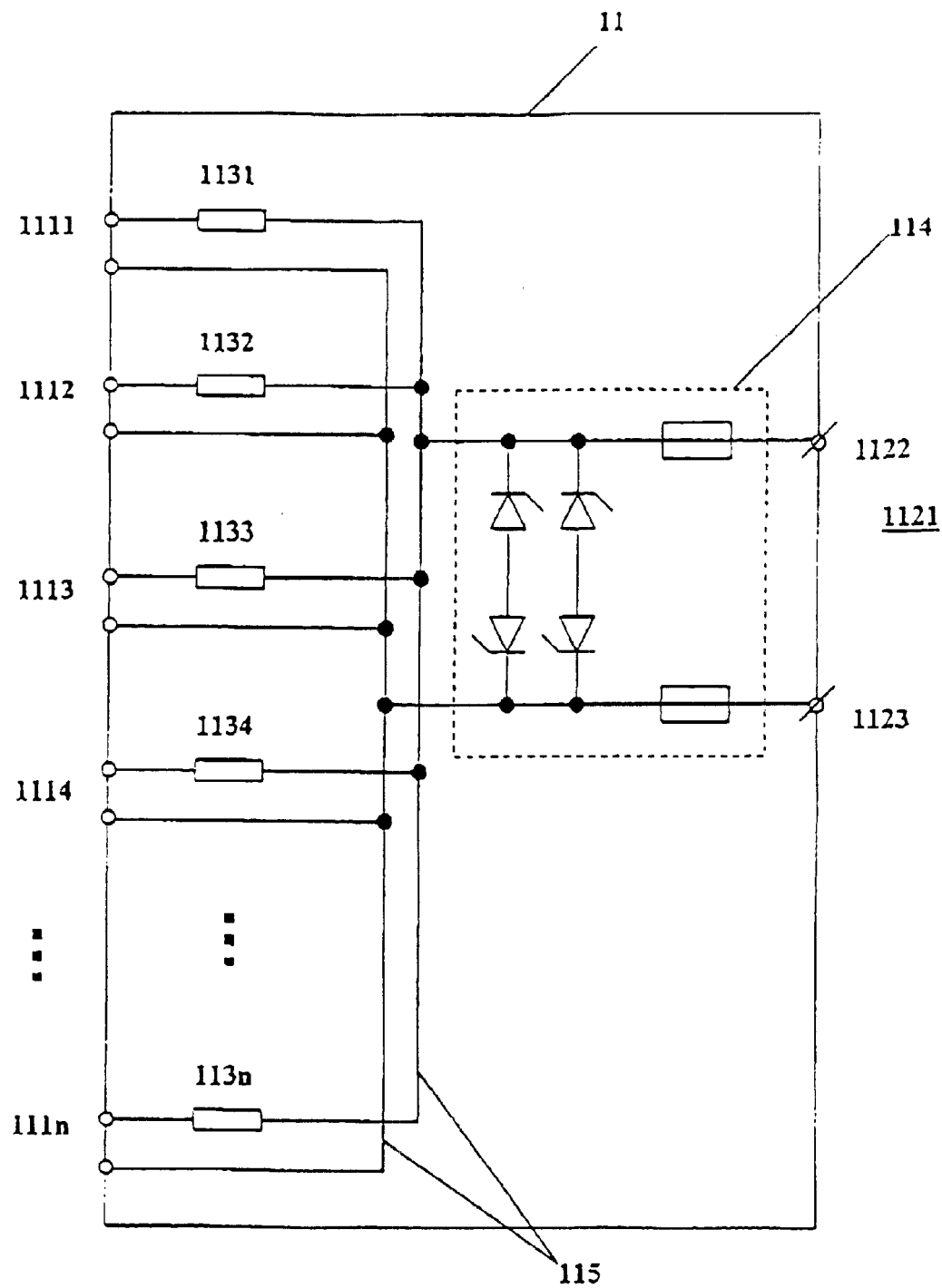
FIG. 2 shows a detailed illustration of a field bus distributor
Figure 3:
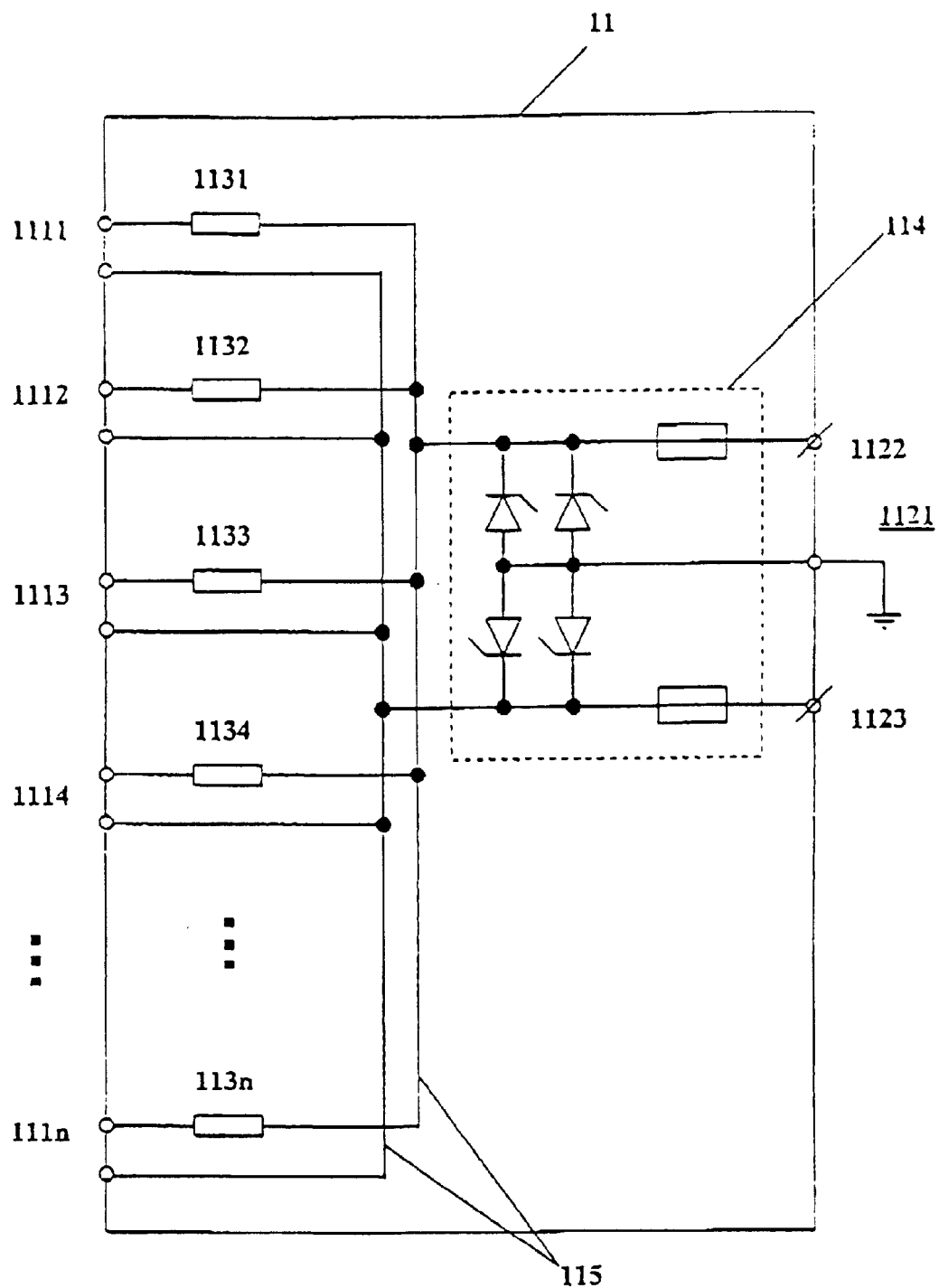
FIG. 3 shows a detailed illustration of a field bus distributor which is expanded to form an operationally ungrounded safety barrier.

In accordance with FIGS. 2 and 3, the conductors of the non-intrinsically safe electric circuit 24 are connected to terminals 1122 and 1123 of a protected connection 1121 for connection of a non-intrinsically safe electric circuit 24 of the field bus distributor 11 arranged in the area 1 at risk of explosion. The terminals 1122 and 1123 of the protected connection 1121 have mechanical protection against impermissible manipulation of the connection between the conductors of the non-intrinsically safe electric circuit 24 and the respective terminal 1122 and 1123 in the live state of the terminals 1122 and 1123. Such terminals are known per se and described in DE 195 13 645, for example.

The field bus distributor 11 is equipped with n connections 1111 to 111n for intrinsically safe electric circuits for connection of a plurality of field devices 121 to 12n. Each of the n connections. 1111 to 111n for intrinsically safe electric circuits is connected to a busbar arrangement 115 via a current limiting means 1131 to 113n. The terminals 1122 and 1123 of the protected connection 1121 for connection of a non-intrinsically safe electric circuit 24 are connected to the busbar arrangement 115 via voltage limiting means 114.

In the simplest case, the current limiting means 1131 to 113n are designed as series resistors channel by channel for each intrinsically safe electric circuit 13. Electronic current limiting may alternatively be provided.

The field bus distributor 11 has a housing-like encapsulation enclosing all the live components as a whole. In this case, provision may be made for realizing the encapsulation by potting with a suitable potting compound known per se. As an alternative, provision may be made for realizing the encapsulation by a sand-filled housing which encloses the field bus distributor 11.

Each intrinsically safe electric circuit 1111 to 111n proceeding from the field bus distributor 11 carries a voltage- and current-intensity-limited supply power for the connected field devices 121 to 12n and superposed communication signals appertaining to the data transmission.

Depending on the power demand of each field device 121 to 12n, provision may be made, in a particular refinement of the invention, for connecting a plurality of field devices 121 to 12n to the same intrinsically safe electric circuit 13.

The voltage limiting means 114 are constructed from zener diodes which are redundantly reverse-connected in series and are connected in parallel with the non-intrinsically safe electric circuit 24 and upstream of which at least one fuse is connected on the supply side. As a result, excessive voltage increases in the non-intrinsically safe electric circuit 24 are effectively limited to permissible values irrespective of their plurality.

The means for voltage limiting 114 are embodied singly in each field bus distributor 11 for all the intrinsically safe electric circuits 13 proceeding from the field bus distributor 11.

By virtue of the grounding of the node of the interconnection of the zener diodes in accordance with FIG. 3, the voltage limiting means 114 can be expanded to form an operationally ungrounded safety barrier in a simple and advantageous manner and with additional components being dispensed with. The effect of this is that the reliable and complete isolation of the field bus from the supply network [lacuna].

For simple voltage limiting in accordance with FIG. 2, provision may alternatively be made for connecting two bipolar zener diodes in parallel. Furthermore, provision may be made for realizing the voltage limiting using other suitable means such as integrated voltage regulators or thyristor circuits.

Such field bus couplers 22 are known per se and can be supplied as ancillary equipment for field bus instrumentation.

To ensure that the largest possible number of field devices can be connected to the field bus coupler, a large electrical power must be routed into the area at risk of explosion. By way of example, the provision of a useful power of approximately 320 mA*16 V=5.12 W is desirable if, given connection of n=32 field devices, a current of approximately 10 mA is required for each field device. Such powers and useful currents are incompatible with the "intrinsic safety" type of protection and are therefore routed with increased safety into the area at risk of explosion.

In practice, a core pair is laid as bus line to the field bus distributor 11 mounted in the area 1 of a process engineering installation that is at risk of explosion. The bus line transmits, via a non-intrinsically safe electric circuit 24, the necessary energy for supplying the measurement transducers, sensors and actuators 121 to 12n and it transmits the digitally coded measurement data from the process proceeding in the area 1 at risk of explosion into the control room arranged in the area 2 not at risk of explosion, where a stored-program controller or a process control system performs the evaluation and processing of the measurement data. Different operating modes of the measurement transducers, sensors and actuators 121 to 12n can also be set via the field bus.

The safety-relevant voltage, current and power routed on the field bus is initially not upwardly limited. Therefore, this two-wire line is designed with the aim of explosion protection in the "increased safety" type of protection. This likewise applies to the connection and the encapsulation of the field bus in the area 1 at risk of explosion within the field bus distributor or the distributor housing. The "intrinsic safety" is ensured only after complete current and voltage limiting according to the provisions. Only if intrinsic safety is provided is it possible for the user to exchange and service field devices without danger in the course of the operation of an installation.

The field bus distributor according to FIG. 2 can be certified autonomously. All that is necessary in this case is a demonstration to the effect that the field bus potential is reliably isolated from the supply network by the power supply unit connected upstream. All the components in the distributor housing are dimensioned in such a way as to meet the requirements of the standards.

The field bus distributor in accordance with FIG. 3 represents a safety barrier for field bus systems which are permitted to be mounted in the area 1 at risk of explosion and which has common voltage limiting for all the measurement channels. The requisite connection to the equipotential bonding ("ground" symbol) is present. This obviates the requirement for the field bus potential to be reliably isolated from the supply network by the power supply unit connected upstream.

In this case, the requirements made of DC isolation of the field bus are not determined by the explosion protection but are restricted to values which are necessary only for the function.

| List of reference symbols | |
|---|---|
| 1 | Area at risk of explosion |
| 11 | Field bus distributor |
| 1111 to 111n | Connection for an intrinsically safe electric circuit |
| 1121 | Protected connection |
| 1122, 1123 | Terminals |
| 1131 to 113n | Current limiting means |
| 114 | Voltage limiting means |
| 115 | Busbar |
| 121 to 12n | Field devices |
| 13 | Intrinsically safe electric circuit |
| 2 | Area not at risk of explosion |
| 21 | Voltage source |
| 22 | Field bus coupler |
| 23 | Main field bus run |
| 24 | Non-intrinsically safe electric circuit |

What is claimed is:

1. A field bus arrangement comprising:
   a) a field bus distributor for mounting in an area at risk of explosion, for feeding a plurality of field devices, arranged in said area at risk of explosion, by way of intrinsically safe electric circuits from at least one high-energy voltage source arranged in an area not at risk of explosion, and for data transmission; and
   b) a field bus coupler arranged in said area not at risk of explosion, said coupler having first, second and third electric circuits which are DC-isolated from one another,
   said field bus coupler connected through said first electric circuit to a main field bus run routed in said area not at risk of explosion,
   said voltage source connected through said second electric circuit to said field bus coupler, and
   said third electric circuit is routed as a non-intrinsically safe electric circuit into said area at risk of explosion;
   said field bus distributor comprising:
      components capable of carrying an electrical current, said components enclosed as a whole in a housing like encapsulation,
      n connections for said intrinsically safe electric circuits for connection of said plurality of field devices,
      at least one protected connection for connection of said non-intrinsically safe electric circuit,
      current limiting means, voltage limiting means and a busbar arrangement,
      each of said n connections for said intrinsically safe electric circuits is connected to said busbar arrangement by way of a respective one of said current limiting means, and
      said at least one protected connection for connection of a non-intrinsically safe electric circuit is connected to said busbar arrangement by way of said voltage limiting means.

2. The field bus arrangement of claim 1, wherein said protected connection of said field bus distributor for connection of said non-intrinsically safe electric circuit has terminals with mechanical protection against impermissible manipulation of the connection between the conductors of said non-intrinsically safe electric circuit and the respective one of said terminals when said terminals are carrying an electrical current.

3. The field bus arrangement of claim 1 wherein said voltage limiting means are formed by reverse-connected series zener diodes.

4. The field bus arrangement of claim 2 wherein said voltage limiting means are formed by reverse-connected series zener diodes.

5. The field bus arrangement of claim 3 wherein those connections of said zener diodes of said voltage limiting means which are remote from said non-intrinsically safe electric circuit are interconnected to form a node, and said field bus distributor has a grounding connection which is connected to said node of the interconnection of said zener diodes of said voltage limiting means.

6. The field bus arrangement of claim 3 wherein those connections of said zener diodes of said voltage limiting means which are remote from said non-intrinsically safe electric circuit are interconnected to form a node, and said field bus distributor has a grounding connection which is connected to said node of the interconnection of said zener diodes of said voltage limiting means.

7. The field bus arrangement of claim 1 wherein said encapsulated components of said field bus distributor are potted with a suitable potting compound.

8. The field bus arrangement of claim 2 wherein said encapsulated components of said field bus distributor are potted with a suitable potting compound.

9. The field bus arrangement of claim 3 wherein said encapsulated components of said field bus distributor are potted with a suitable potting compound.

10. The field bus arrangement of claim 4 wherein said encapsulated components of said field bus distributor are potted with a suitable potting compound.

11. The field bus arrangement of claim 5 wherein said encapsulated components of said field bus distributor are potted with a suitable potting compound.

12. The field bus arrangement of claim 6 wherein said encapsulated components of said field bus distributor are potted with a suitable potting compound.

13. The field bus arrangement of claim 1 wherein said field bus distributor is encapsulatedby a sand-filled housing which encloses said field bus distributor as a whole.

14. The field bus arrangement of claim 2 wherein said field bus distributor is encapsulated by a sand-filled housing which encloses said field bus distributor as a whole.

15. The field bus arrangement of claim 3 wherein said field bus distributor is encapsulated by a sand-filled housing which encloses said field bus distributor as a whole.

16. The field bus arrangement of claim 4 wherein said field bus distributor is encapsulated by a sand-filled housing which encloses said field bus distributor as a whole.

17. The field bus arrangement of claim 5 wherein said field bus distributor is encapsulated by a sand-filled housing which encloses said field bus distributor as a whole.

18. The field bus arrangement of claim 6 wherein said field bus distributor is encapsulated by a sand-filled housing which encloses said field bus distributor as a whole.

* * * * *